J. C. Miller,
Horse Power.
No. 25,752 — Fig. 1 — Patented Oct. 11, 1859.
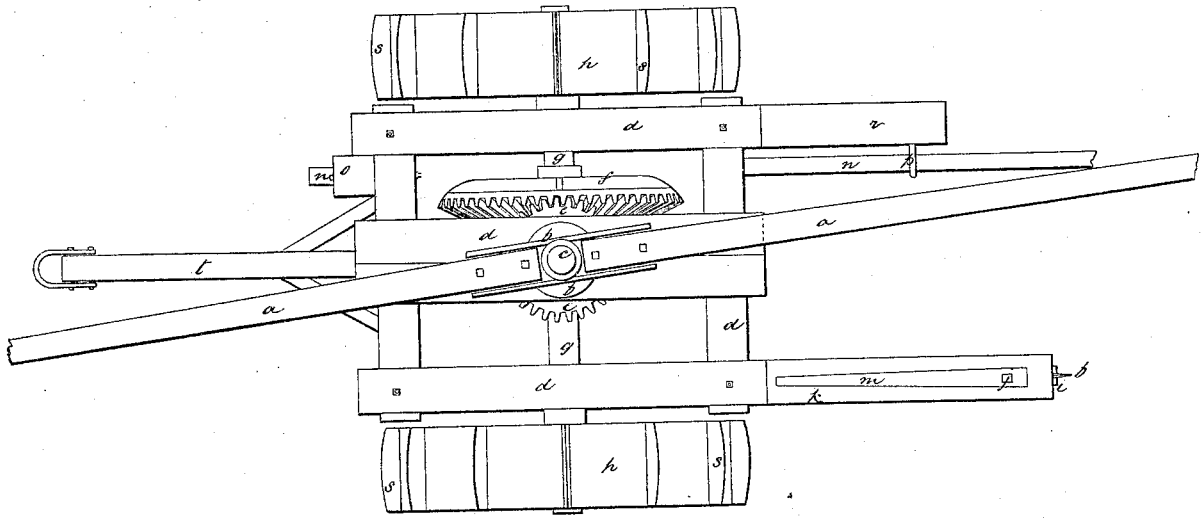
Fig. 2
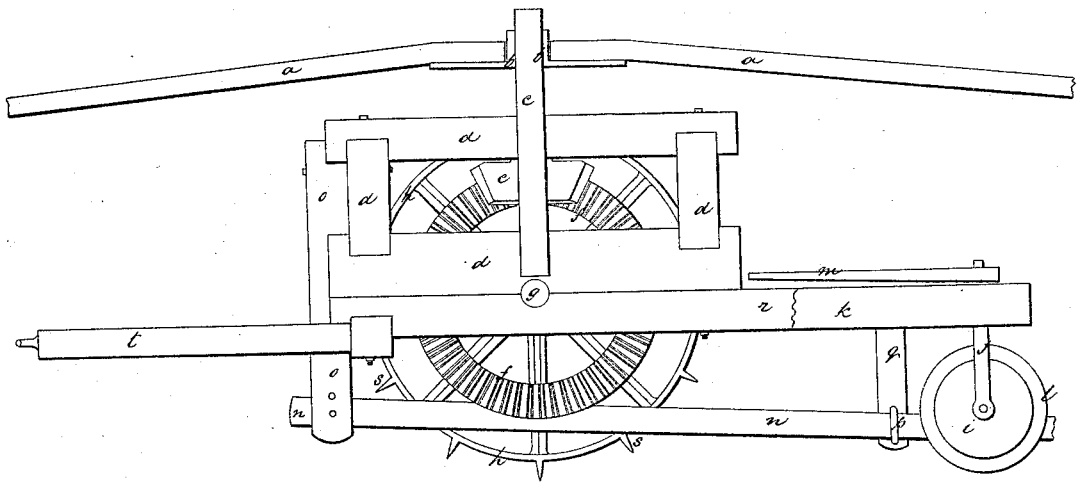
Witnesses:
Hervey Evans
S. A. Clemens
Inventor
James C. Miller
AM. PHOTO-LITHO. CO. N.Y. (OSBORNE'S PROCESS)

UNITED STATES PATENT OFFICE.

JAMES C. MILLER, OF UNION TOWNSHIP, UNION COUNTY, OHIO.

HORSE-POWER LOCOMOTIVE.

Specification of Letters Patent No. 25,752, dated October 11, 1859.

*To all whom it may concern:*

Be it known that I, JAMES C. MILLER, of Union township, Irwin post-office, in the county of Union and State of Ohio, have invented a new and useful Improvement in Horse-Power Locomotives; and I do hereby declare that the following is a full and exact description of the same, reference being had to the accompanying drawings, making part of this specification, of which—

Figure 1 is a plan, and Fig. 2, a sectional elevation of my said invention, the same letters referring to like parts in both figures.

My invention principally consists in the combination of a sweep-lever horse-power, by frame work and gearing, with one or more ground wheels, which, by the revolution of the axis of the horizontal sweep-levers, are made to roll upon the surface of the ground and move the whole machine, and by the adhesion of the ground wheels to the surface, may be made to exert a powerful tractive force upon any resisting object to which the machine may be attached, for draft.

In the accompanying drawings $a, a,$ are sweep-levers, to the outmost ends of which, (not shown in the figures) draft animals are attached in the usual way of stationary sweep horse-powers, and, at their inner ends the levers $a, a,$ are fastened to and supported by a flanged hub $b$, which is fast upon a vertical shaft $c$, which is held in position by suitable journal boxes in the frame of the machine $d$. Upon the shaft $c$ is fastened a bevel wheel $e$, which engages with another bevel wheel $f$, which is fastened to an axle shaft $g$, which, by its journal boxes, supports the frame of the machine, and, at its ends, has attached the ground or traction wheels $h, h$.

A steering wheel $i$, is supported, by its axis-pin passing through the lower ends of a forked caster-post $j$, which passes through a beam $k$, which extends horizontally from the frame $d$, (and, in Fig. 2, is shown in a side elevation of beam $k$, and its attachments). The steering wheel is made with a circular cutter $l$, in its middle plane, which is designed to penetrate the ground until the flat periphery of the wheel rests upon its surface, and secure a firm lateral hold upon the soil and give direction to the steering wheel, when the latter is operated by a steering lever $m$, which, at one end is made fast to the upper end of the caster-post.

$n$, is a draft-bar to the remote end of which any object to be drawn forward by the machine is attached, and it is connected to the frame of the machine by a bolt which passes through the lower end of a hanging post $o$, and, toward its opposite end, it passes through a staple $p$, in a post $q$, which, at its upper end, is fastened to a beam $r$, which projects from the frame. The draft-bar $n$, is hung low and to one side of the middle line of the machine, to prevent the latter from tending to turn around and tip down behind, in consequence of the torsion of the sweep-levers and the resistance applied to the remote end of the draft-bar.

$s, s, s,$ are claws upon the peripheries of the ground wheels. By means of a tongue $t$, the machine can be drawn forward, and guided from place to place, and set in position for use, as a traction machine.

In operating my invention, animal power is applied to the extremities of the levers $a\ a$, moving them in the direction which will cause the machine to advance, by means of the connecting gearing described, and draw forward any resisting object which may be attached to the remote end of the draft-bar. The animals attached to the levers move continually in circles around the machine stepping over the draft-bar at each turn and advancing as the machine advances, and, direction is given to the latter, right or left, by operating the lever of the steering wheel.

This machine is of special use to haul a mole-plow or machine for making covered field-drains, but it may be used for other purposes of traction.

I contemplate modifications of construction in my invention, using a single ground wheel, or even three or four, constructed by suitable geering and frame with a sweep-lever horse-power. A pair of truck wheels may be used to steer the machine and support a part of its frame, instead of the single steering-wheel represented in the drawings.

The ground wheel or wheels may either have plain rolling surfaces, or be provided with claws, either fixed or removable, and extending quite across the faces of the wheels, or, alternately part way across. The two ground wheels may either or both of them be so attached to their axle-shaft, that they may be adjustably made fast or loose, for convenience in turning the machine, in any of the usual methods of attaching wheels for this object. Furthermore, I contemplate the attachment to the machine of an additional pair of bevel or miter wheels, attached to the same shafts, and working in gear with each other, either within or outside the position of the bevel wheels shown in the figures of the drawing, the parts of the machine being modified as is necessary to the proposed addition,—the object being to afford a change of gearing to vary the speed and power of the machine, which, with the additional pair of wheels, may be easily effected by clutches or set-screws, applied in the usual way, to make fast or loose either pair of the bevel or miter wheels, on either of their supporting shafts. Therefore, I do not wish to be limited to the particular construction of my machine herein described.

I do not claim separately the parts constituting my machine.

What I claim and wish to secure by Letters Patent is—

Horse-power sweep-levers connected with one or more ground wheels; substantially as described and for the specified purposes.

JAMES C. MILLER.

Witnesses:
HERVEY EVANS,
S. A. CLEMENS.